United States Patent
Kume

(10) Patent No.: US 8,978,508 B2
(45) Date of Patent: Mar. 17, 2015

(54) UMBILICAL MEMBER GUIDE MECHANISM AT FRONT END OF WRIST OF INDUSTRIAL ROBOT

(71) Applicant: FANUC Corporation, Minamitsuru-gun, Yamanashi (JP)

(72) Inventor: Hirokazu Kume, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/761,415

(22) Filed: Feb. 7, 2013

(65) Prior Publication Data

US 2013/0255424 A1 Oct. 3, 2013

(30) Foreign Application Priority Data

Mar. 27, 2012 (JP) ................. 2012-070871

(51) Int. Cl.
  *B25J 17/00* (2006.01)
  *B25J 19/00* (2006.01)
  *F16L 3/18* (2006.01)

(52) U.S. Cl.
  CPC .............. *B25J 19/00* (2013.01); *B25J 19/0025* (2013.01); *F16L 3/18* (2013.01); *Y10S 901/29* (2013.01)
  USPC ........................ 74/490.02; 74/490.06; 901/29

(58) Field of Classification Search
  USPC ............... 74/490.01, 490.02, 490.03, 490.05, 74/490.06; 901/28, 29
  See application file for complete search history.

(56) References Cited

U.S. PATENT DOCUMENTS

| | | | |
|---|---|---|---|
| 4,705,243 A | 11/1987 | Hartmann et al. | |
| 6,014,909 A | 1/2000 | Fiora | |
| 6,431,018 B1 | 8/2002 | Okada et al. | |
| 6,455,799 B1 * | 9/2002 | Forslund et al. ........... | 219/86.25 |
| 6,622,585 B1 * | 9/2003 | Salomonsson et al. .... | 74/490.02 |
| 7,430,939 B2 | 10/2008 | Matsumoto et al. | |
| 7,546,985 B1 * | 6/2009 | Choi ............................... | 248/49 |
| 8,006,586 B2 * | 8/2011 | Tealdi et al. ............... | 74/490.02 |
| 2001/0052564 A1 | 12/2001 | Karlinger | |
| 2002/0135334 A1 | 9/2002 | Uematsu et al. | |
| 2003/0200831 A1 | 10/2003 | Matsumoto et al. | |
| 2004/0149064 A1* | 8/2004 | Narita et al. ............... | 74/490.03 |
| 2005/0189333 A1 | 9/2005 | Nakagiri et al. | |

FOREIGN PATENT DOCUMENTS

DE 3434899 A1 5/1985
DE 3929140 A1 3/1991

(Continued)

*Primary Examiner* — David M Fenstermacher
*Assistant Examiner* — Emily Cheng
(74) *Attorney, Agent, or Firm* — Drinker Biddle & Reath LLP

(57) ABSTRACT

A shaft member (12) has a hollow pipe (13) extending coaxially with its axis of center of rotation and a tool mounting surface (12c) positioned at the front end of the shaft member. An umbilical member guide mechanism (10) includes an umbilical member fastening part (20) attached to a tool mounting surface side of the shaft member, a plurality of umbilical members (30) are guided from the arm side of the robot through the hollow pipe of the shaft member and fastened at the end of the hollow pipe at the tool mounting surface side by an umbilical member fastening part in parallel with the axis of center of rotation, and attaching parts (48a to 48d) which attach the umbilical member fastening part to the front end of the shaft member at one phase of at least two predetermined phases around the axis of center of rotation.

5 Claims, 13 Drawing Sheets

(56) References Cited

FOREIGN PATENT DOCUMENTS

| | | |
|---|---|---|
| DE | 20010696 U1 | 7/2001 |
| DE | 69800450 T2 | 9/2001 |
| DE | 60006165 T2 | 7/2004 |
| JP | 08-057793 | 3/1996 |
| JP | 10-329079 A | 12/1998 |
| JP | 2001-150382 A | 6/2001 |
| JP | 2002-079487 A | 3/2002 |
| JP | 2002-528287 | 9/2002 |
| JP | 2003-503222 | 1/2003 |
| JP | 2004-090152 | 3/2004 |
| JP | 3739756 B2 | 1/2006 |
| JP | 2011-161571 | 8/2011 |
| WO | WO-00/52992 | 5/2000 |
| WO | WO-01/00372 | 1/2001 |
| WO | WO-01/39933 A1 | 6/2001 |

* cited by examiner

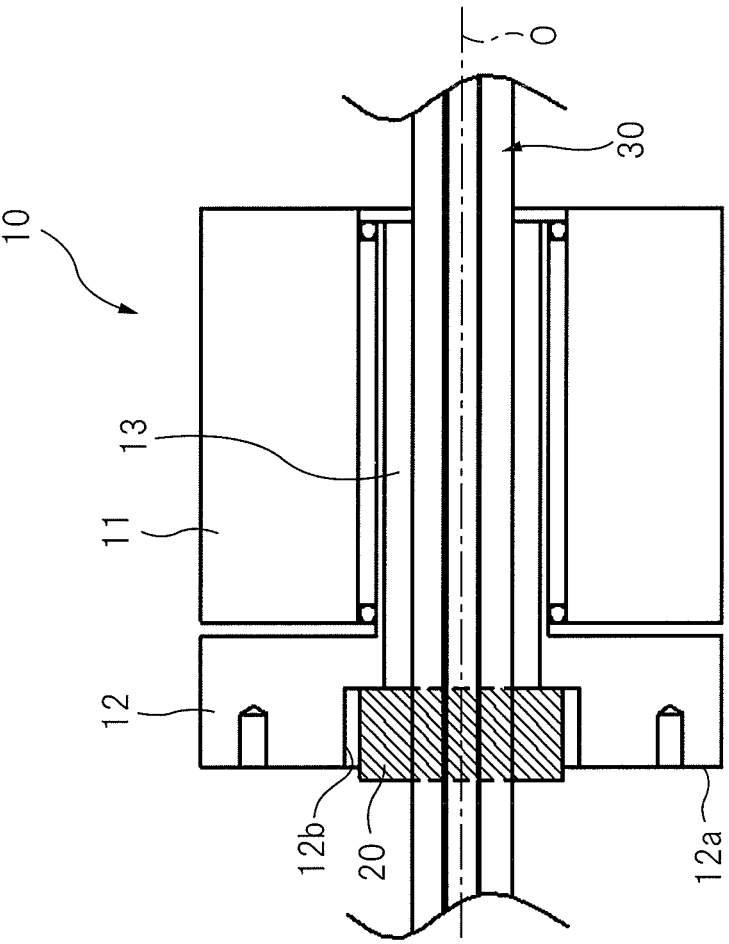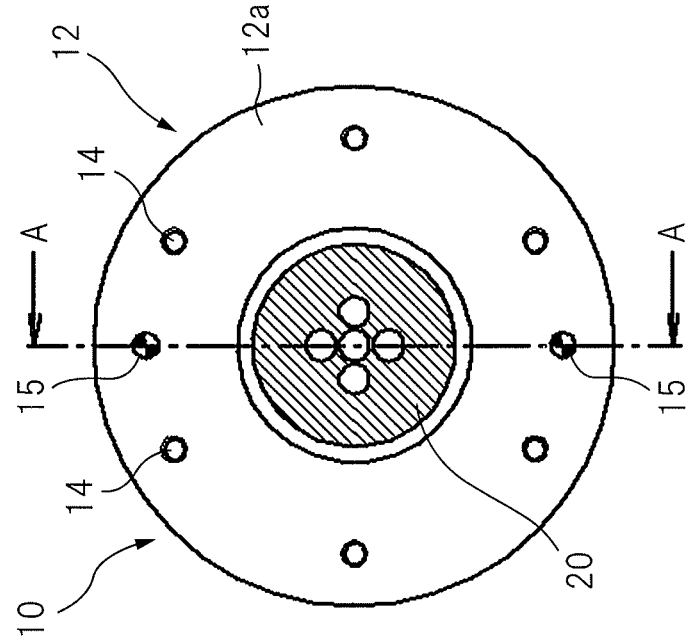

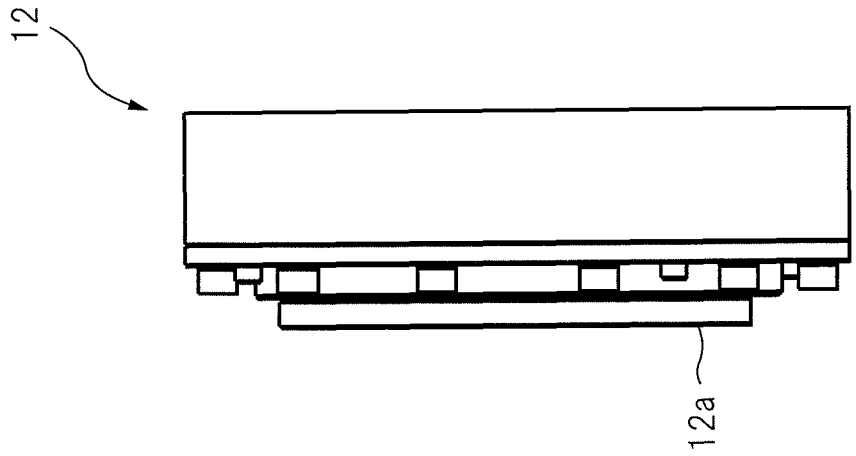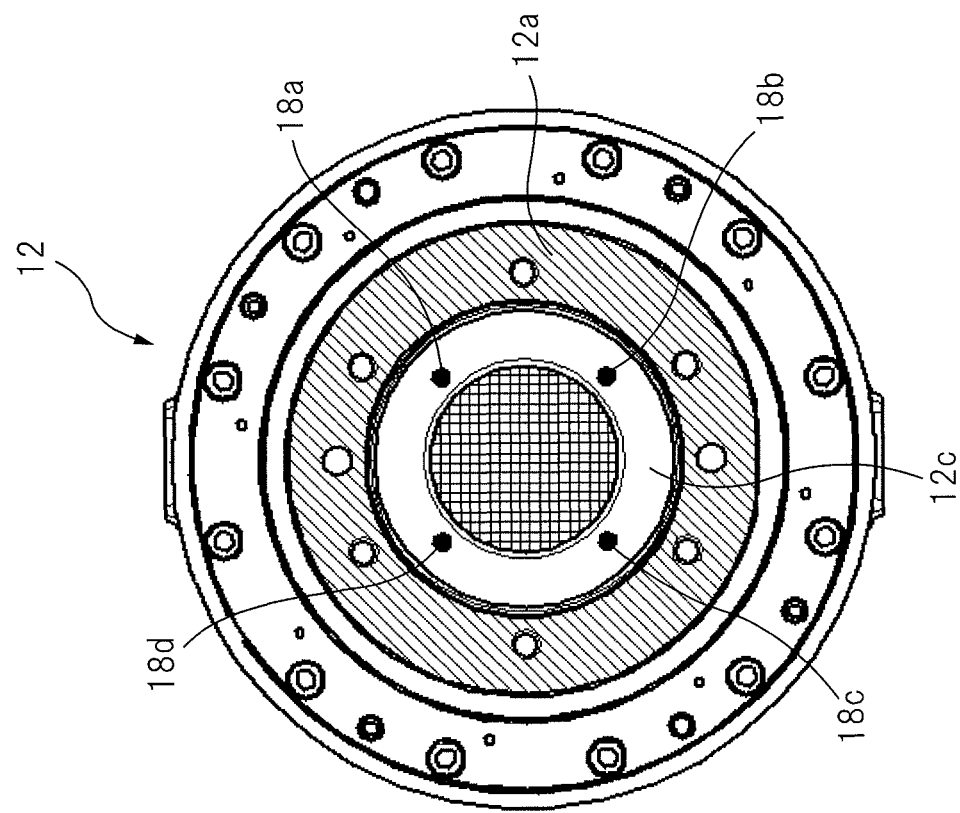

PATTERN 1

PATTERN 2

PATTERN 3

PATTERN 4

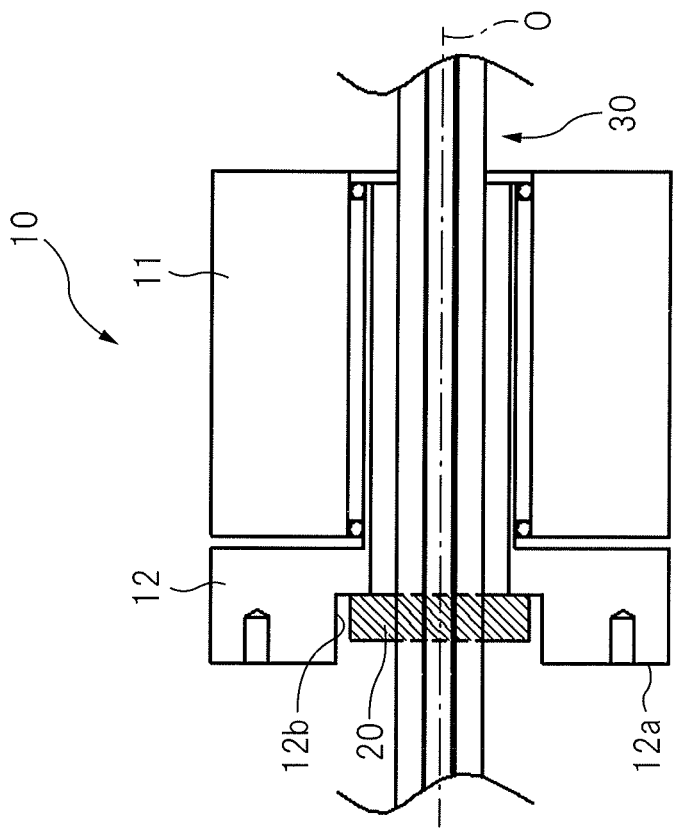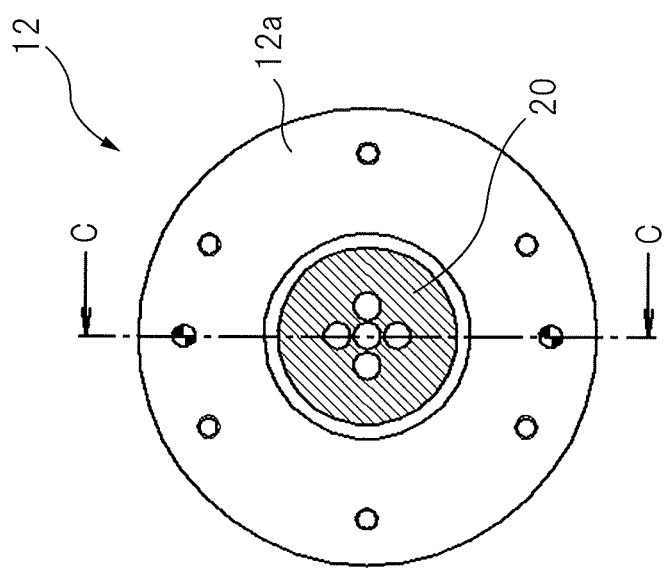

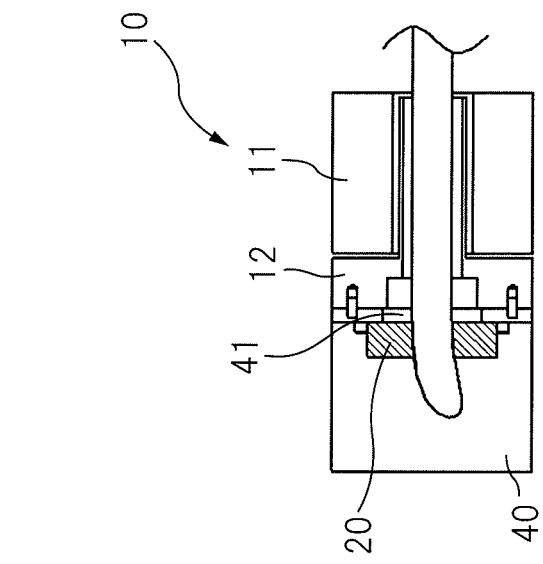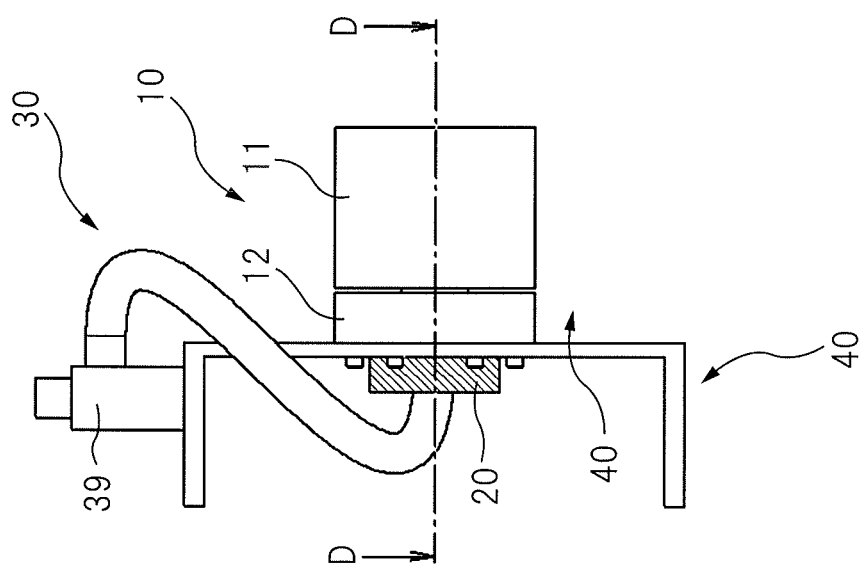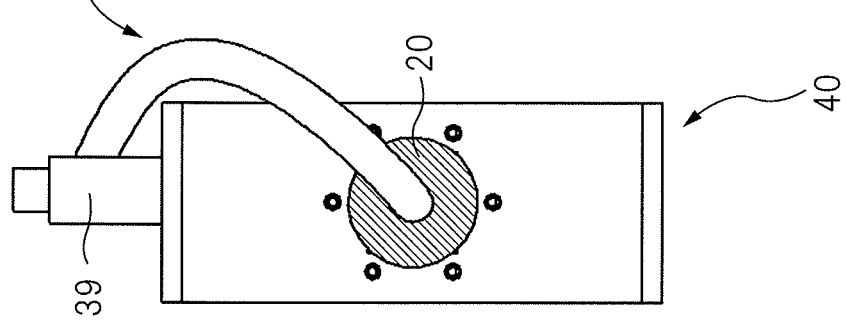

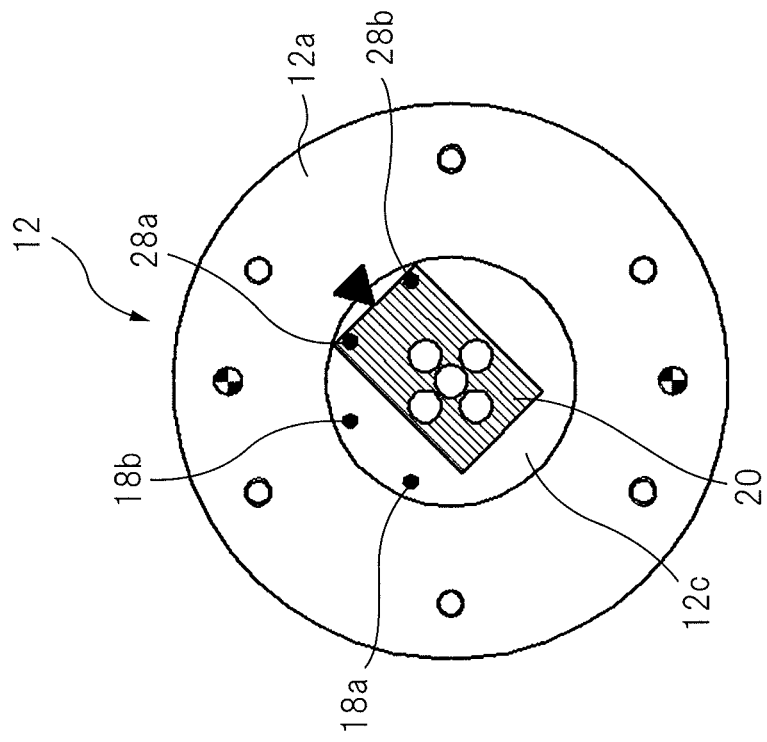
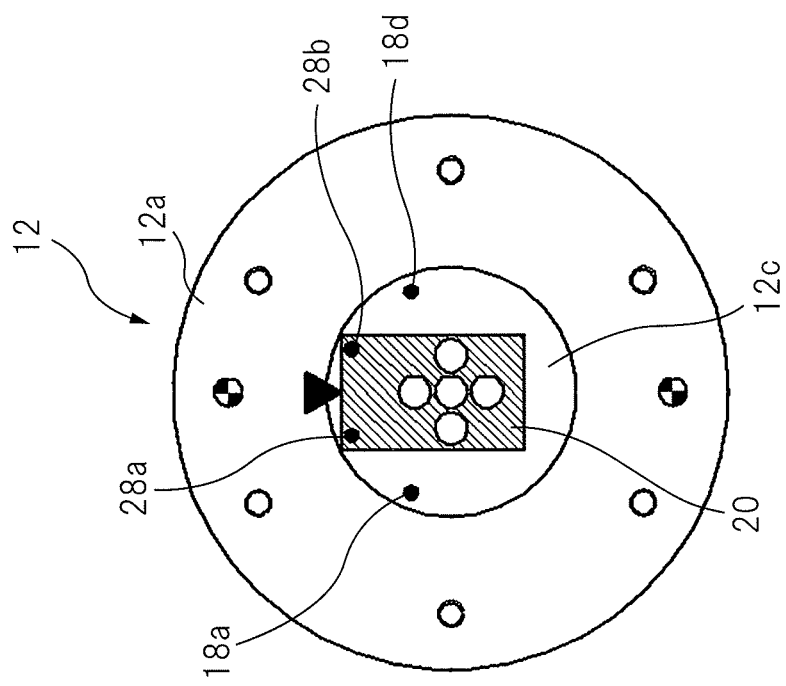

UMBILICAL MEMBER GUIDE MECHANISM AT FRONT END OF WRIST OF INDUSTRIAL ROBOT

RELATED APPLICATION DATA

This application claims priority under 35 U.S.C. §119 and/or §365 to Japanese Application No. 2012-070871 filed Mar. 27, 2012, the entire contents of which is incorporated herein by reference.

BACKGROUND OF THE INVENTION

1. Field of the Invention

The present invention relates to an umbilical member guide mechanism at a front end of a wrist of an industrial robot.

2. Description of the Related Art

At a wrist part of an industrial robot etc., an umbilical member guide mechanism which guides a plurality of umbilical members, which are led from an arm side to the wrist part of the robot, to a tool which is attached to the front end of the wrist is considered necessary. The umbilical member guide mechanism is configured to guide the plurality of umbilical members via the outside of the wrist part to the tool or is configured to guide the plurality of umbilical members via the inside of the wrist part to the tool.

Japanese Unexamined Patent Publication No. 2001-150382 A1 discloses a configuration which uses a bracket from which a plurality of umbilical members are suspended together by a spring so as to guide the plurality of umbilical members via the outside of the wrist part to the tool. Furthermore, Japanese Unexamined Patent Publication No. 2002-79487 A1, Japanese Unexamined Patent Publication No. 10-329079 A1, and Japanese Patent No. 3739756 disclose configurations which guide a plurality of umbilical members to a hollow part which is positioned at a center of rotation of the front end of the wrist of a robot.

However, the prior art has the following problems.

In both a configuration guiding the members via the outside of the wrist part and a configuration guiding the members via the inside of the write part, the motion range of a final output shaft part of the front end of the wrist (tool mounting surface side) is limited by the durability of the laid umbilical members. Such a limitation on the motion range is the usually the same extent in the plus direction and minus direction from the reference position.

However, when a robot is actually used, often the motion range of the final output shaft part is not the same extent in the plus direction and minus direction from the reference position, that is, a motion range biased to either the plus direction or minus direction is demanded. For example, when the motion range of the final output shaft part is limited to ±180°, but in actuality use from −100° to +225° is demanded, due to the limitation on the motion range, there will be a range where operation is not possible. In such a case, it is necessary to change the mounting phase of the tool which is mounted at the front end of the wrist so as to match with the required motion range.

However, to change the mounting phase of a tool, some measure has to be taken at the tool side. The phase of a tool with respect to the final output shaft part is positioned by for example pins. In such a case, to change the mounting phase of the tool, it is necessary to change to another tool of the same shape but different pin positions.

For this reason, detaching a tool and attaching another tool takes time. Further, when further changing the motion range by changing the mounting phase of a tool again, it is necessary to prepare tools further different in pin positions.

Furthermore, when the motion range changes in a configuration guiding the members via the outside of the wrist, it is necessary to change the fastening position of the umbilical members. Therefore, the motion of the umbilical members also change. For this reason, there is a possibility of umbilical members interfering with the peripheral equipment. Further, there is also the problem of an unexpected load acting on the umbilical members and the umbilical members greatly falling in durability.

The present invention was made in view of this situation and has as its object the provision of an umbilical member guide mechanism which enables a motion range of a final output shaft part of a front end of a wrist of a robot to be easily changed as desired without umbilical members interfering with peripheral equipment and without causing a drop in the durability of the umbilical members.

SUMMARY OF INVENTION

To achieve the above-mentioned object, according to a first aspect, there is provided an umbilical member guide mechanism which guides a plurality of umbilical members, which are led from an arm side of a robot to a wrist part, to a tool which is attached to a front end of the wrist, the umbilical member guide mechanism comprising a shaft member which is arranged at a front end of the wrist of the robot, the shaft member being provided with a hollow pipe which extends coaxially with the axis of center of rotation and a tool mounting surface which is positioned at the front end of the shaft member, an umbilical member fastening part which is attached to the tool mounting surface side of the shaft member, the plurality of umbilical members being guided from an arm side of the robot through the hollow pipe of the shaft member and being fastened by the umbilical member fastening part in parallel with the axis of center of rotation, and attaching parts which attach the umbilical member fastening part to a front end of the shaft member at one phase of at least two predetermined phases around the axis of center of rotation.

According to a second aspect, there is provided the first aspect wherein the tool or flange which is attached to the tool mounting surface is formed with a through hole and wherein the plurality of umbilical members are guided from the umbilical member fastening part through the through hole up to the tool.

According to a third aspect, there is provided the first or second aspect wherein the umbilical member fastening part is arranged inside a recessed part which is formed in the tool mounting surface.

According to a fourth aspect, there is provided an umbilical member guide mechanism which guides a plurality of umbilical members, which are led from an arm side of a robot to a wrist part, to a tool which is attached to a front end of the wrist, the umbilical member guide mechanism comprising a shaft member which is arranged at a front end of the wrist of the robot, the shaft member being provided with a hollow pipe which extends coaxially with the axis of center of rotation and a tool mounting surface which is positioned at the front end of the shaft member, a tool which is attached to the tool mounting surface or a flange which is arranged between the tool and the tool mounting surface, the tool or the flange being formed with a through hole, an umbilical member fastening part which is attached to the tool or the flange, the plurality of umbilical members being guided from an arm side of the robot through the hollow pipe of the shaft member and being fastened by the umbilical member fastening part in parallel with the axis of center of rotation, and, the plurality of umbilical members being guided from the umbilical member fastening part through the through hole of the tool or the flange up to the tool, and, attaching parts which attach the umbilical member fastening part to the tool or the flange at one phase of at least two predetermined phases around the axis of center of rotation.

These objects, features, and advantages of the present invention and other objects, features, and advantages will become further clearer from the detailed description of typical embodiments of the present invention which are shown in the attached drawing.

BRIEF DESCRIPTION OF DRAWINGS

FIG. 1A is an end view of an umbilical member guide mechanism based on a first embodiment of the present invention.

FIG. 1B is a cross-sectional view seen along the line A-A of FIG. 1A.

FIG. 4A is a detailed end view of a second engaging member.

FIG. 4B is a side view of the second engaging member which is shown in FIG. 4A.

FIG. 9A is an end view of an umbilical member guide mechanism based on a third embodiment of the present invention.

FIG. 9B is a cross-sectional view seen along the line C-C of FIG. 9A.

FIG. 10A is an end view of an umbilical member guide mechanism based on a fourth embodiment of the present invention.

FIG. 10B is a side view of the umbilical member guide mechanism which is shown in FIG. 10A.

FIG. 10C is a cross-sectional view seen along the line D-D of FIG. 10B.

FIG. 13A is a view which explains an additional embodiment of the present invention and is similar to FIG. 6A.

FIG. 13B is a view which explains an additional embodiment of the present invention and is similar to FIG. 6B.

DETAILED DESCRIPTION

Below, the attached figures will be referred to so as to explain the embodiments of the present invention. In the following figures, similar members are assigned similar reference signs. To facilitate understanding, these figures are suitably changed in scale.

Figure 11:
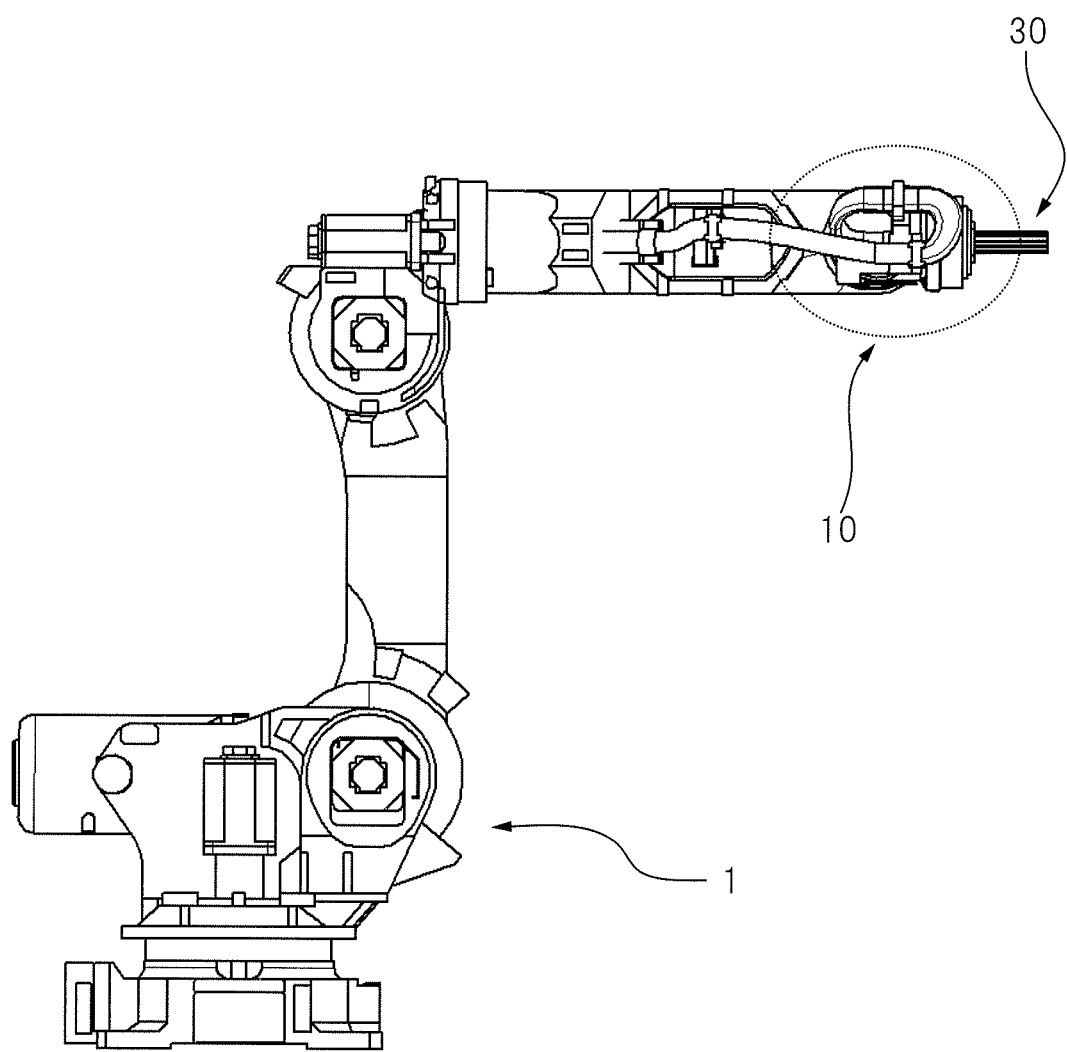
FIG. 11 is a side view of a robot which is provided with an umbilical member guide mechanism according to the present invention.
Figure 12:
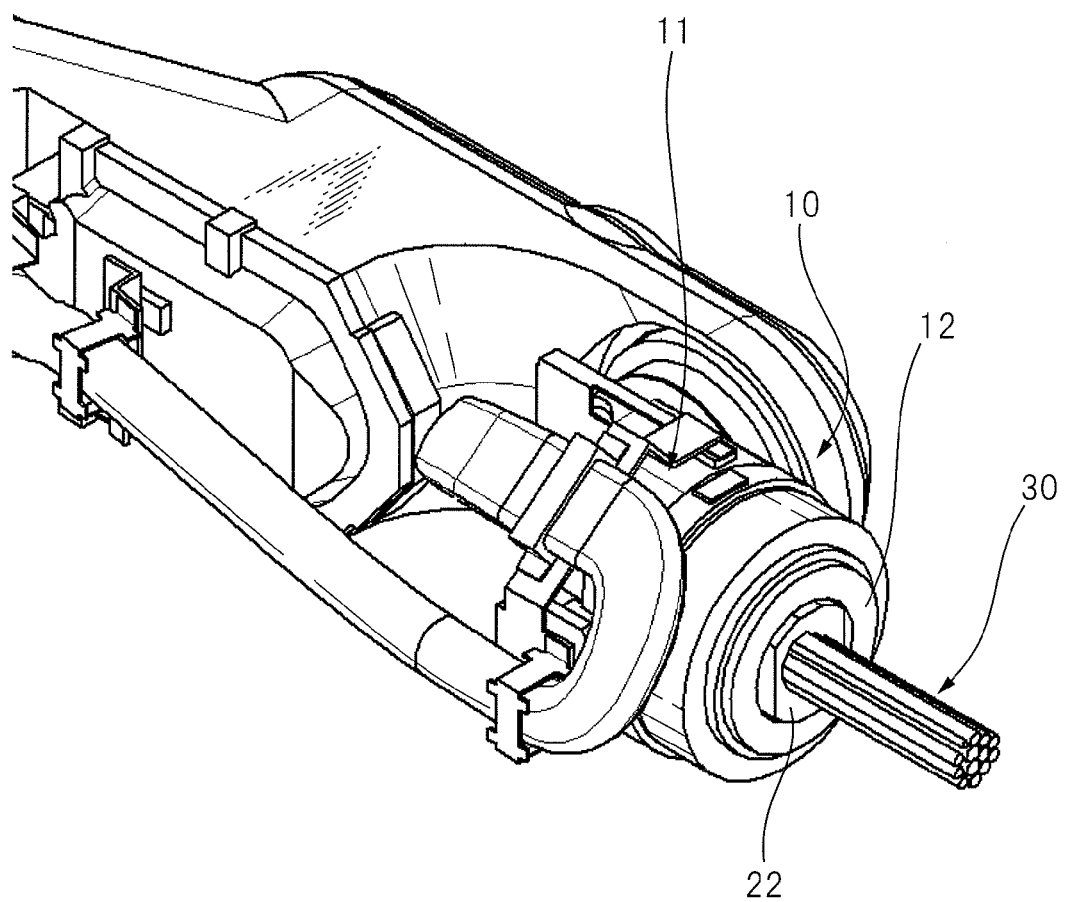
FIG. 12 is an enlarged view of a wrist part of the robot which is shown in FIG. 11.

FIG. 11 is a side view of a robot which is provided with an umbilical member guide mechanism according to the present invention. FIG. 12 is an enlarged view of a wrist part of the robot which is shown in FIG. 11. As shown in these figures, the umbilical member guide mechanism 10 according to the present invention is provided at a front end of a wrist (final output shaft part) of an industrial robot 1, for example, a multiarticulated robot.

Furthermore, FIG. 1A is an end view of an umbilical member guide mechanism according to a first embodiment of the present invention, while FIG. 1B is a cross-sectional view which is seen along the line A-A of FIG. 1A. As shown in these figures, the umbilical member guide mechanism 10 includes an arm side first engaging member 11 and a tool side second engaging member 12 which adjoins and engages with the first engaging member 11.

Note that, these first engaging member 11 and second engaging member 12 may also be parts of the body of the industrial robot 1. Alternatively, these first engaging member 11 and second engaging member 12 may configure the front end of the wrist of the industrial robot 1. In such a case, the industrial robot 1 avoidably becomes larger in size.

As can be seen from FIG. 1B, the first engaging member 11 is a substantially cylindrically shaped member which is provided with a through hole. The second engaging member 12 is a member of a cross-sectional approximately T-shape formed integrally with the hollow pipe 13 which passes through the second engaging member 12. The second engaging member 12 is arranged coaxially with the first engaging member 11. The hollow pipe 13 is engaged with the through hole of the first engaging member 11 in a manner able to rotate about the axis O of center of rotation. For this reason, the second engaging member 12 may also be called a "shaft member".

As shown in FIG. 1B, the tool mounting surface 12a of the second engaging member 12 is formed at the center with a recessed part 12b. Further, as can be seen from FIG. 1A and FIG. 1B, the umbilical member fastening part 20 which fastens the umbilical member 30 is arranged at the recessed part 12b. The umbilical member fastening part 20 sticks out from the tool mounting surface 12a. Further, the tool mounting surface 12a is formed with a plurality of taps for attaching a not shown tool. Similarly, the tool mounting surface 12a is provided with two tool positioning pins 15 for a tool, facing each other across the diametrical direction.

The plurality of umbilical members 30 are cables for supplying drive force or signals for driving a welding gun or hand which is attached to the front end of the robot and tubes which supply cooling water or drive-use air. The plurality of umbilical members 30 pass from the arm side of the robot 1 through the first engaging member 11 and second engaging member 12 of the umbilical member guide mechanism 10 and are fastened by the umbilical member fastening part 20. Therefore, as illustrated, the umbilical member 30 is substantially parallel to the axis O of the center of rotation of the umbilical member guide mechanism 10. Further, the plurality of umbilical members 30 extend from the umbilical member fastening part 20 to the tool, for example, the hand 40.

Figure 2A:
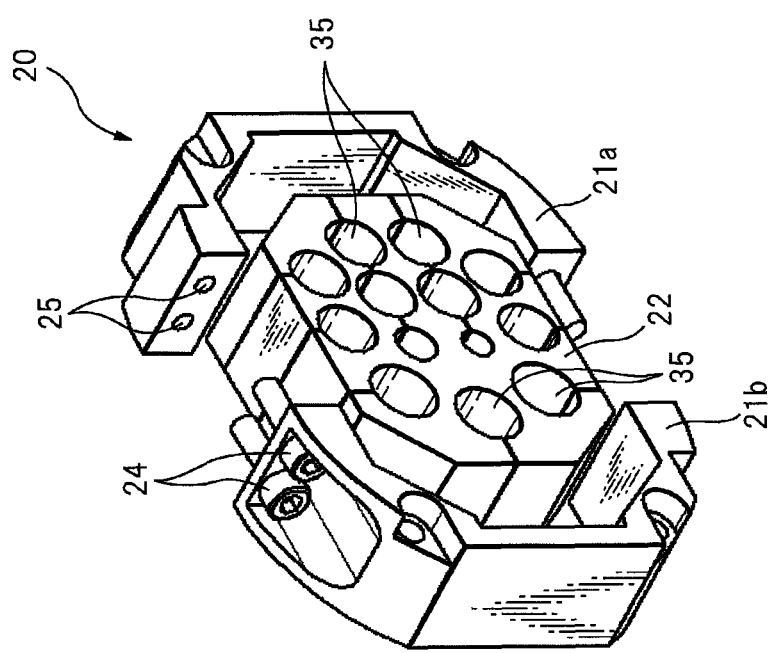
FIG. 2A is a disassembled perspective view of an umbilical member fastening part.
Figure 2B:
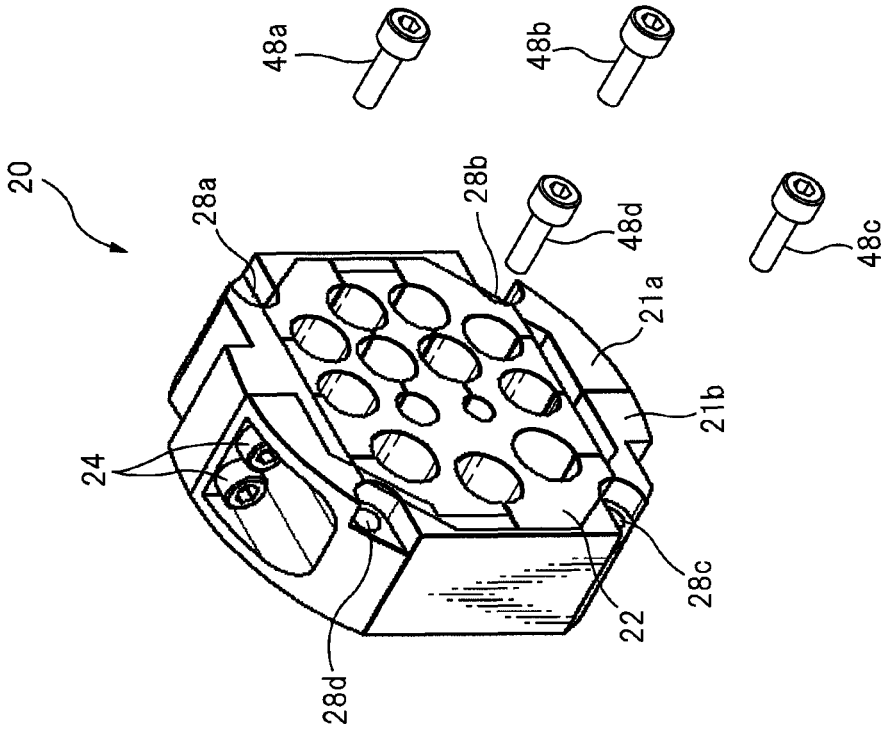
FIG. 2B is a perspective view of an umbilical member fastening part.

FIG. 2A is a disassembled perspective view of an umbilical member fastening part, while FIG. 2B is a perspective view of an umbilical member fastening part. As shown in FIG. 2A, two fastening parts 21a, 21b are assembled from the two sides of a rubber clamp 22 in which a plurality of through holes 35 are formed. Further, bolts 24 which are attached to the fastening part 21b are screwed into holes 25 of the fastening part 21a. Due to this, as shown in FIG. 2B, an umbilical member fastening part 20 comprised of two fastening part 21a, 21b between which a rubber clamp 22 is fastened is prepared.

Figure 3:
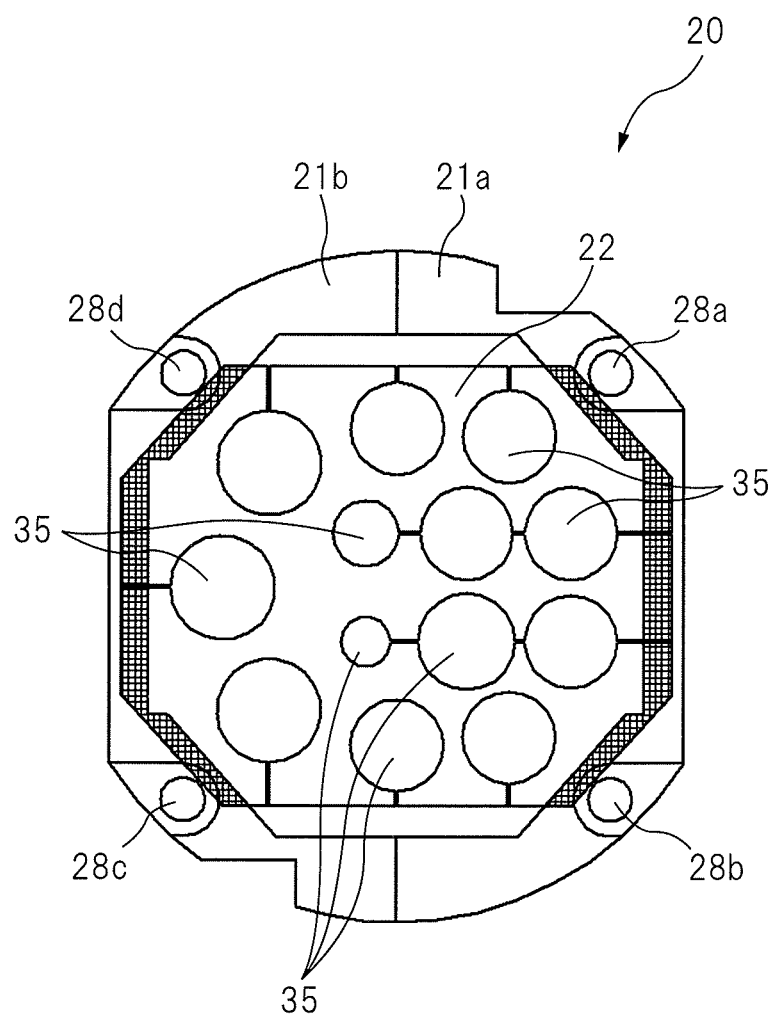
FIG. 3 is a front view of an umbilical member fastening part.

FIG. 3 is a front view of an umbilical member fastening part. As shown in FIG. 3, between the two fastening parts 21a, 21b, a generally regular octagonal space is formed. Further, the rubber clamp 22 has an elongated octagonal shape which generally corresponds to the space between the two fastening parts 21a, 21b. However, the rubber clamp 22 may be a generally regular octagonal shape which corresponds to the two fastening parts 21a, 21b. Further, the space between the two fastening parts 21a, 21b may also have another shape, for example, a generally regular polygonal shape. The rubber clamp 22 may also have an outer shape corresponding to this.

As shown in FIG. 3, one fastening part 21a is formed with two bolt through holes 28a, 28b, while the other fastening part 21b is formed with two bolt through holes 28c, 28d. These bolt through holes 28a to 28d are arranged so as to form a square shape when the two fastening parts 21a, 21b are assembled.

Further, the rubber clamp 22 is formed with a plurality of through holes 35 through which the plurality of umbilical members 30 respectively pass. As explained above, the plurality of umbilical members 30 are cables for supplying drive power or signals, tubes for supplying cooling water or drive-use air, etc., so their diameters differ with each other. Therefore, as can be seen from FIG. 3, these plurality of through holes 35 differ from each other in diameter. Further, for similar reasons, the plurality of through holes 35 are arranged asymmetrically with respect to the center of the rubber clamp 22.

FIG. 4A is a detailed end view of a second engaging member, while FIG. 4B is a side view of the second engaging member which is shown in FIG. 4A. In these views, to facilitate understanding, the umbilical member fastening part 20 is removed. As shown in these figures, part of the tool mounting surface 12a around the hollow pipe 13 is a mounting surface 12c for umbilical member fastening part to which the umbilical member fastening part 20 is attached. The mounting surface 12c for umbilical member fastening part is formed with four bolt tap holes 18a to 18d. These bolt tap holes 18a to 18d are formed at positions which correspond to the bolt through holes 28a to 28d of the umbilical member fastening part 20.

Figure 5A:
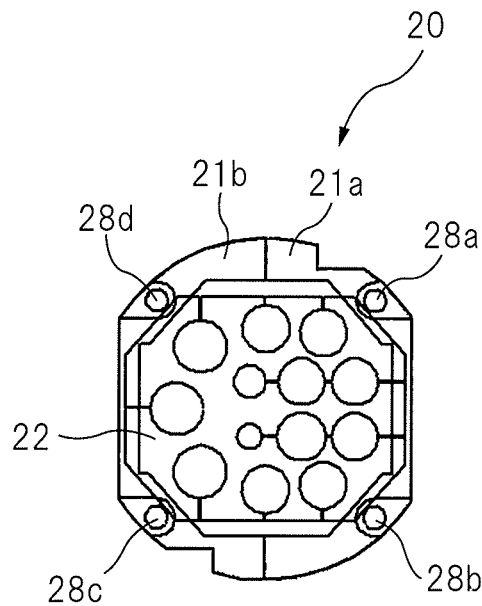
FIG. 5A is a first view which shows a posture of an umbilical member fastening part which is attached to a mounting surface for umbilical member fastening part.

FIG. 5A to FIG. 5D are views which show the posture of the umbilical member fastening part which is attached to the mounting surface for umbilical member fastening part. In the pattern 1 which is shown in FIG. 5A, the bolt through holes 28a to 28d of the umbilical member fastening part 20 correspond to the bolt tap holes 18a to 18d of the mounting surface 12c for umbilical member fastening part. The umbilical member fastening part 20 is fastened by the bolts 48a to 48d which are shown in FIG. 2B to the mounting surface 12c for umbilical member fastening part. Note that, the umbilical member fastening part 20 is fastened coaxially with the axis O of center of rotation.

Figure 5B:
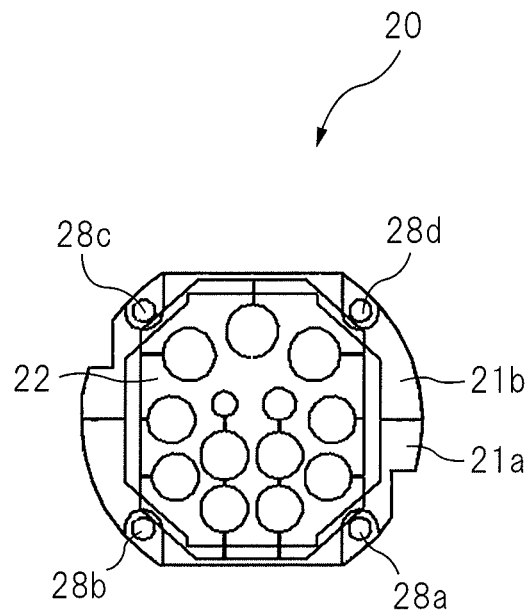
FIG. 5B is a second view which shows a posture of an umbilical member fastening part which is attached to a mounting surface for umbilical member fastening part.

Further, if making the umbilical member fastening part 20 rotate 90° in the clockwise direction, as shown in FIG. 5B, the pattern 2 is obtained. In this case, the bolt through holes 28a to 28d of the umbilical member fastening part 20 respectively correspond to the bolt tap holes 18b, 18c, 18d, 18a of the mounting surface 12c for umbilical member fastening part.

Figure 5C:
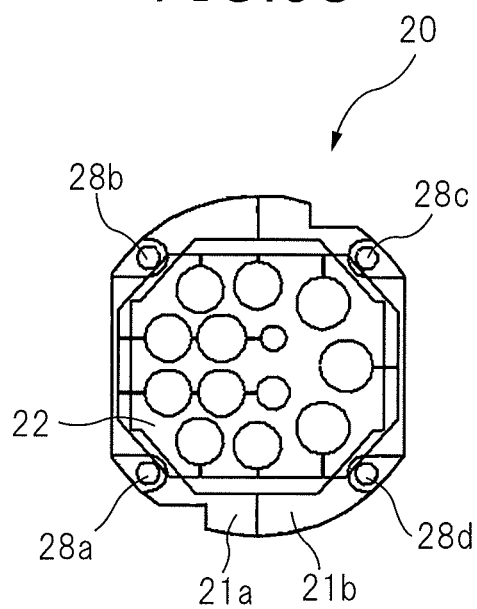
FIG. 5C is a third view which shows a posture of an umbilical member fastening part which is attached to a mounting surface for umbilical member fastening part.
Figure 5D:
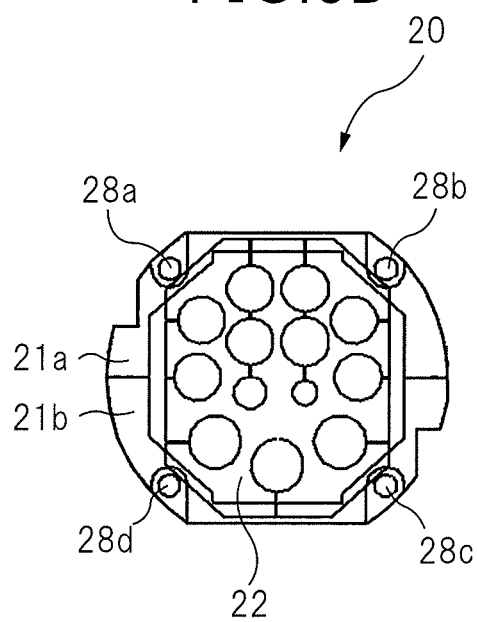
FIG. 5D is a fourth view which shows a posture of an umbilical member fastening part which is attached to a mounting surface for umbilical member fastening part.

Similarly, if making the umbilical member fastening part 20 rotate from the pattern 2 a further 90° clockwise, as shown in FIG. 5C, the pattern 3 is obtained. Further, if making the umbilical member fastening part 20 rotate from the pattern 3 a further 90° clockwise, as shown in FIG. 5D, the pattern 4 is obtained. The relationship of the bolt through holes of the umbilical member fastening part 20 and the bolt tap holes of the mounting surface for umbilical member fastening part 12c in the pattern 1 to the pattern 4 is as shown in Table 1. In each pattern, the bolts 48a to 48d are similarly passed through the bolt tap holes 18a to 18d and bolt through holes 28a to 28d and fasten the umbilical member fastening part 20 to the mounting surface 12c for umbilical member fastening part.

|  | Mounting surface for umbilical member fastening part | 18a | 18b | 18c | 18d | Phase |
| --- | --- | --- | --- | --- | --- | --- |
| Pattern 1 | Umbilical member fastening part | 28a | 28b | 28c | 28d | 0° |
| Pattern 2 |  | 28d | 28a | 28b | 28c | 90° |
| Pattern 3 |  | 28c | 28d | 28a | 28b | 180° |
| Pattern 4 |  | 28b | 28c | 28d | 28a | 270° |

In this way, in the present invention, it is possible to make the umbilical member fastening part 20 rotate by 90° increments and attach the umbilical member fastening part 20 by different phases to the mounting surface 12c for umbilical member fastening part. Further, the plurality of through holes 35 which are formed at the rubber clamp 22 changes in the same way to match the phase of the umbilical member fastening part 20.

For this reason, in the present invention, it is possible to attach the plurality of umbilical members 30 by different predetermined phases to the front end of the second engaging member 12. Therefore, even when use exceeding the limited motion range of the umbilical members 30 is demanded to the robot 1, the phase of the umbilical member fastening part 20 is made to change to meet with this. Due to this, even when use exceeding the limited motion range is demanded, the final output shaft part (tool mounting surface 12a side) of the second engaging member 12 of the robot 1 is made to operate so as correspond to this. This is particularly advantageous when the second engaging member 12 is used at the front end of the wrist of the robot 1.

Further, in the present invention, the phase of the plurality of umbilical members 30 can be changed in the range at which the durability of the umbilical members 30 is secured, so the umbilical members 30 never fall in durability. Further, such a change is sufficient in the second engaging member 12, so there is no need for change at the tool side. Therefore, there is no need to prepare other tools with different positions of the fastening pins. Furthermore, the plurality of umbilical members 30 pass through the hollow pipe 13 of the second engaging member 12, so these umbilical members 30 also do not interfere with the peripheral equipment of the robot 1.

In this connection, it may also be considered to detach the plurality of umbilical members 30 from the through holes 35 of the umbilical member fastening part 20, separate the umbilical member fastening part 20 and take out the rubber clamp 22, change this to another rubber clamp 22 different in phase, twist the umbilical members 30, and re-insert them into through holes 35 of the other rubber clamp 22. In this case, the phase of the umbilical member fastening part 20 does not have to be changed.

However, preparing other rubber clamps 22 different in phase requires additional costs. Further, in this case, control of the amount of twisting of the umbilical members 30 is difficult. In other words, there is a possibility of several of the umbilical members 30 among the plurality of umbilical member 30 being subjected to excessive load and those umbilical members 30 falling in durability. Furthermore, taking out the umbilical members 30 from the through holes 35 and reinserting them in the through holes 35 of the other rubber clamp 22 is extremely complicated work. Therefore, it will be understood that just simply changing the phase of the umbilical member fastening part 20 as in the present invention is extremely advantageous in changing the motion range of the robot.

Figure 6A:
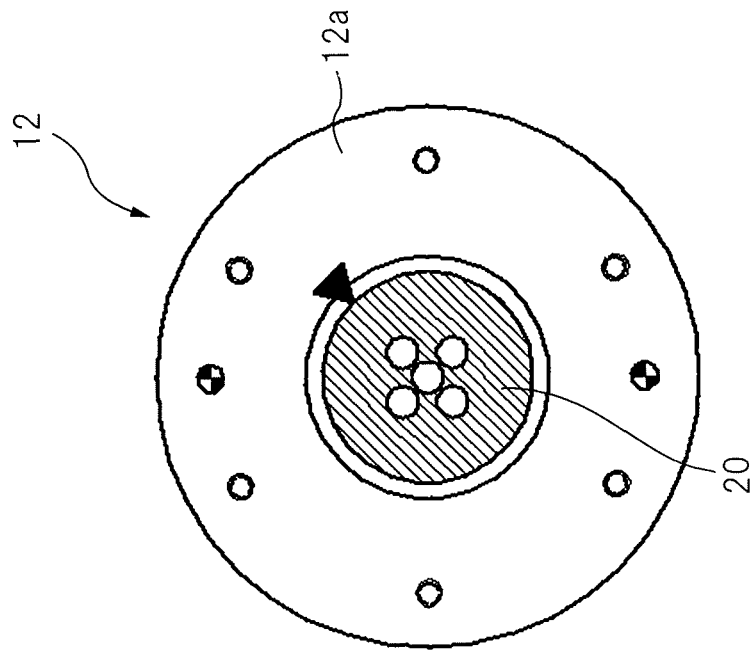
FIG. 6A is a first end view of an umbilical member guide mechanism for explaining another embodiment of the present invention.
Figure 6B:
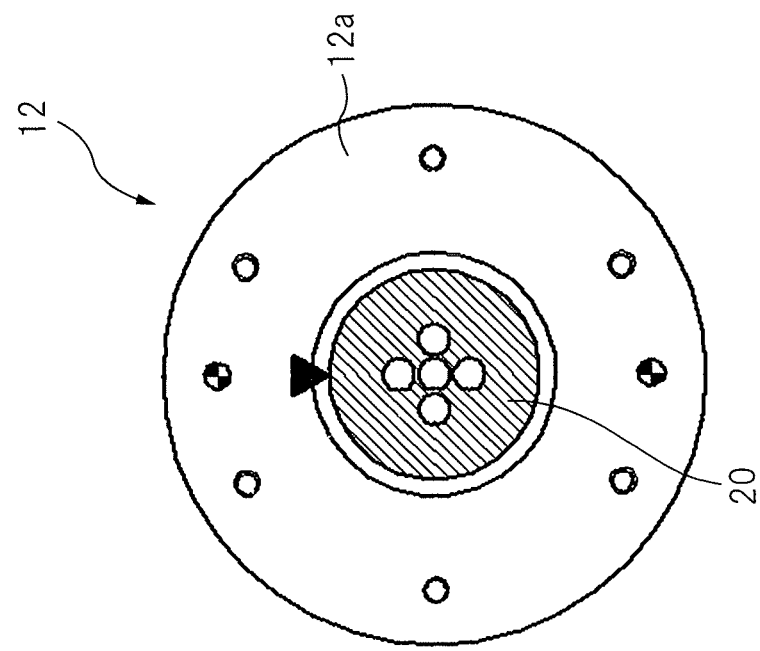
FIG. 6B is a second end view of an umbilical member guide mechanism for explaining another embodiment of the present invention.

FIG. 6A and FIG. 6B are end views of the umbilical member guide mechanism for explaining another embodiment of the present invention. In the first embodiment which was explained with reference to FIG. 1 etc., the phase of the umbilical member fastening part 20 could be changed in 90° increments. However, in FIG. 6A and FIG. 6B, the phase of the umbilical member fastening part 20 can be changed in 45° increments. In other words, in FIG. 6A and FIG. 6B, eight bolt tap holes of the mounting surface 12c for umbilical member fastening part and eight bolt through holes of the umbilical member fastening part 20 are formed at equal intervals in the circumferential direction.

For example, the motion range of the final output shaft part is set to 180° from the reference position in the plus direction and minus direction, but sometimes use of −100° to +225° is required. In such a case, as shown in FIG. 6A and FIG. 6B, it is sufficient to change the phase of the umbilical member fastening part 20 by 45° to the plus side. Of course, by further forming a large number of bolt tap holes and bolt through holes, the phase of the umbilical member fastening part 20 can be changed by further smaller angles.

Figure 7C:
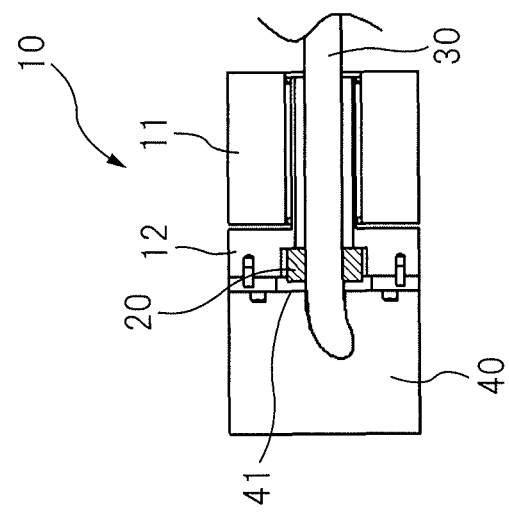
FIG. 7C is a cross-sectional view seen along the line B-B of FIG. 7B.
Figure 7B:
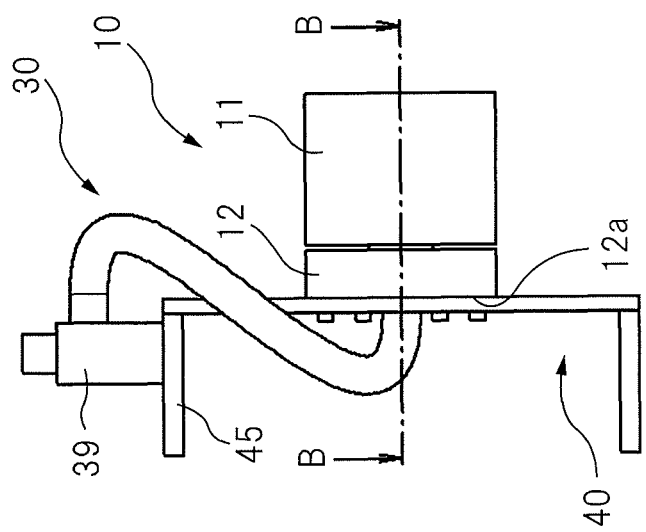
FIG. 7B is a side view of the umbilical member guide mechanism which is shown in FIG. 7A.
Figure 7A:
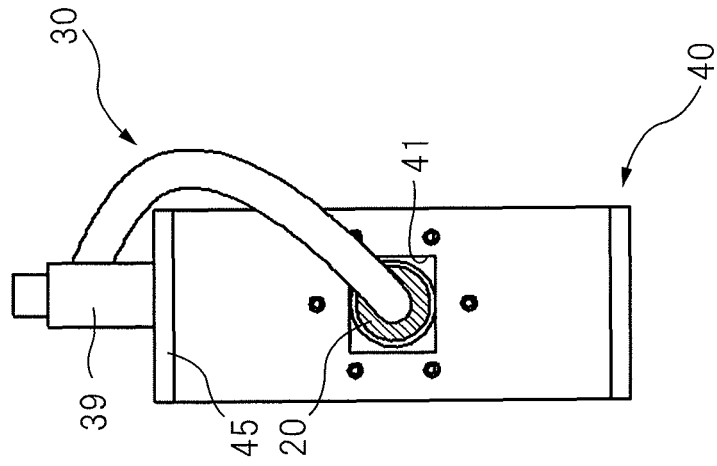
FIG. 7A is an end view of an umbilical member guide mechanism based on a second embodiment of the present invention.

FIG. 7A is an end view of an umbilical member guide mechanism based on a second embodiment of the present invention, FIG. 7B is a side view of an umbilical member guide mechanism which is shown in FIG. 7A, and FIG. 7C is a cross-sectional view which is seen along the line B-B of FIG. 7B. In these figures, at the tool mounting surface 12a of the second engaging member 12, a hand 40 is attached as a tool. Further, as can be seen from FIG. 7A and FIG. 7B, a through hole 41 is formed in the member of the hand 40 which contacts the tool mounting surface 12a.

Furthermore, at a side part 45 of the hand 40, a motor 39 is provided. Further, the plurality of umbilical members 30 pass through the umbilical member fastening part 20 and appear from the through hole 41 of the hand 40 where they are guided to the motor 39. In FIG. 7A, a through hole 41 of a substantially square shape which circumscribes the umbilical member fastening part 20 is shown. However, the through hole 41 may be any shape so long as it does not interfere with the umbilical member fastening part 20. Further, the operation at the final output shaft part (tool mounting surface 12a side) is absorbed by the hollow pipe 13. For this reason, at the front end side of the umbilical member fastening part 20, it is sufficient if there is enough space for the plurality of umbilical members 30 to be guided to the motor 39.

Figure 8A:
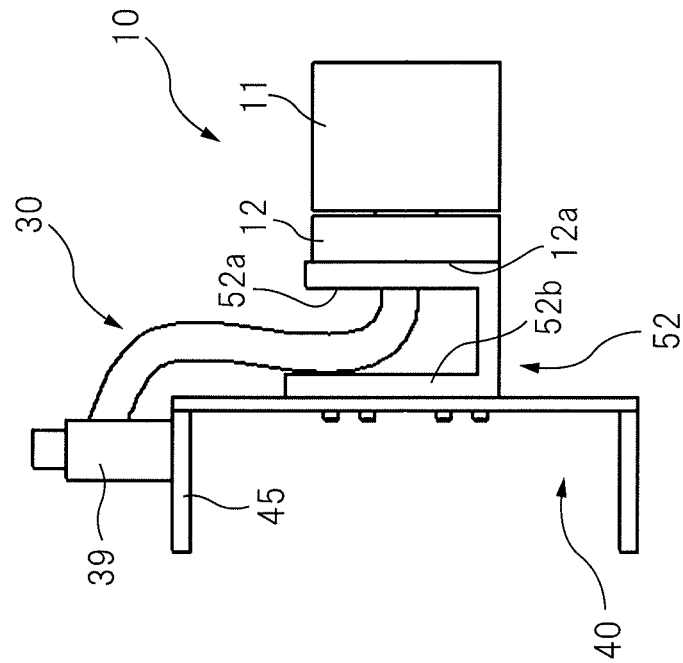
FIG. 8A is a side view of an umbilical member guide mechanism which shows a modification of the second embodiment.

FIG. 8A is a side view of an umbilical member guide mechanism which shows a modification of a second embodiment. In FIG. 8A, an insulating flange 51 is arranged between the second engaging member 12 of the umbilical member guide mechanism 10 and the hand 40. As can be seen from the figure, the insulating flange 51 is formed with a through hole, which is communicated with the through hole 41 of the hand 40. The through hole of the insulating flange 51 may also be the same in shape as the through hole 41 of the hand 40 without interfering with the umbilical member fastening part 20.

Figure 8B:
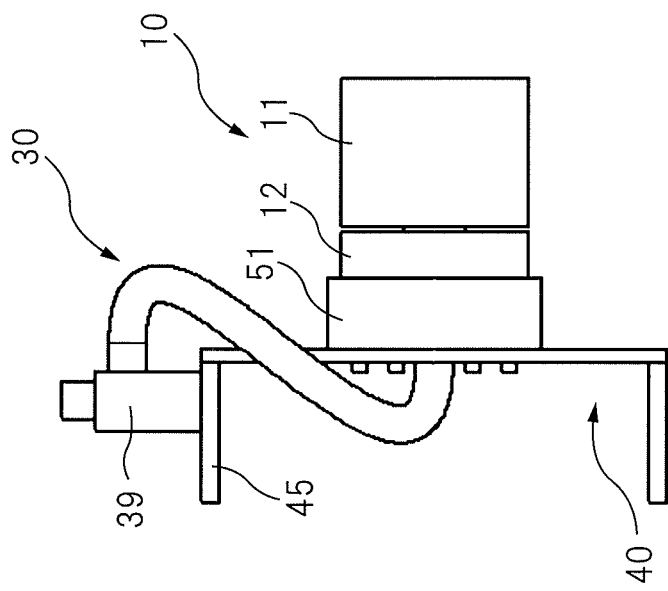
FIG. 8B is a side view of an umbilical member guide mechanism which shows another modification of the second embodiment.

FIG. 8B is a side view of an umbilical member guide mechanism which shows another modification of the second embodiment. In FIG. 8B, a cross-sectional U-shaped flange 52 is arranged between the second engaging member 12 of the umbilical member guide mechanism 10 and the hand 40. As illustrated, one side portion 52a of the flange 52 is attached to the tool mounting surface 12a of the second engaging member 12. Further, the other side portion 52b of the flange 52 is attached to the hand 40. The through hole which is formed at one side portion 52a of the flange 52 is preferably a similar shape as that explained above. When employing an U-shaped flange 52, it will be understood that guidance to the motor 39 is possible without passing the plurality of umbilical members 30 through the inside of the hand 40.

FIG. 9A is an end view of an umbilical member guide mechanism according to a third embodiment of the present invention. FIG. 9B is a cross-sectional view seen along the line C-C of FIG. 9A. In the third embodiment as well, the umbilical member fastening part 20 is arranged at the recessed part 12b of the tool mounting surface 12a. However, in the third embodiment, the end face of the umbilical member fastening part 20 is positioned recessed from the tool mounting surface 12a. This is achieved by forming the recessed part 12b deeper or by employing a thinner umbilical member fastening part 20.

Therefore, in the third embodiment which is shown in FIG. 9B, the tool which is attached to the tool mounting surface 12a (not shown in FIG. 9B) and the umbilical member fastening part 20 never interfere with each other. For this reason, the dimension of the through hole which is formed in the not shown tool, is sufficient if a plurality of umbilical members 30 can pass through the through hole.

FIG. 10A is an end view of an umbilical member guide mechanism according to a fourth embodiment of the present invention. FIG. 10B is a side view of the umbilical member guide mechanism which is shown in FIG. 10A. FIG. 10C is a cross-sectional view which is seen along the line D-D of FIG. 10B. As can be seen from FIG. 10A and FIG. 10B, the umbilical member fastening part 20 is attached to an inside surface of the hand 40 which is attached to the tool mounting surface 12a of the second engaging member 12. In other words, the hand 40 is arranged between the umbilical member fastening part 20 and the second engaging member 12. Note that, the method of attachment of the umbilical member fastening part 20 to the hand 40 is generally similar to that explained with reference to FIG. 3 and FIG. 4, so repeat explanation will be omitted.

Further, as shown in FIG. 10C, the umbilical member fastening part 20 is not arranged in the recessed part 12b of the second engaging member 12. In the fourth embodiment, the recessed part 12b of the second engaging member 12 does not have to be formed.

In the fourth embodiment, the umbilical member fastening part 20 is attached to the hand 40, so the plurality of umbilical members 30 have to be increased by exactly that length. Increasing the umbilical members 30 in length eases the torsion of the umbilical members 30 therefore improvement of the umbilical member 30 in durability is possible.

Further, in the fourth embodiment, even if the hand 40 is attached to the umbilical member guide mechanism 10, the phase of the umbilical member fastening part 20 can be changed. In other words, it is possible to easily change the motion range of the final output shaft part of the front end part of the wrist of the robot 1 (tool mounting surface 12a side) as desired without detaching the hand 40.

Furthermore, in the fourth embodiment, the through hole 41 (not shown) which is formed in the hand 40 is preferably determined in dimensions so that the plurality of umbilical members 30 do not contact the hand 40. Due to this, a drop in the durability of the umbilical members 30 is avoidable.

In the embodiment which is explained referring to FIG. 6A and FIG. 6B, the umbilical member fastening part 20 is circular and is arranged coaxially with the axis O of the center of rotation. However, the umbilical member fastening part 20 need not be coaxial with the axis O of the center of rotation.

FIG. 13A and FIG. 13B are views similar to FIG. 6A and FIG. 6B which explain an additional embodiment of the present invention. In these figures, the umbilical member fastening part 20 is rectangular in shape, while the bolt through holes 28a, 28b of the umbilical member fastening part 20 are formed at one end of the umbilical member fastening part 20. Therefore, the umbilical member fastening part 20 is not arranged coaxially with the axis O of the center of rotation. Further, as illustrated, bolt tap holes 18a to 18d (only some shown) of the mounting surface 12c for umbilical member fastening part are also formed biased in the circumferential direction. The fact that even in such a case, similar effects to the above are obtained should be clear to a person skilled in the art.

Advantageous Effects of Invention

In the first aspect, it is possible to attach a plurality of umbilical members at different predetermined phases to the front end of a shaft member by the attaching members. Therefore, even in the case where use exceeding the limited motion range is demanded, to deal with this, the phase of the umbilical member fastening part can be changed so as to change the motion range of the final output shaft part of the front end of the wrist of the robot as desired.

Further, the phase of the plurality of umbilical members can be changed within the range within which the durability of the plurality of umbilical members is secured, so there is no drop in the durability of the umbilical members. Further, change at the tool side is unnecessary, so there is no need to prepare other tools differing in pin positions. Furthermore, the plurality of umbilical members pass through the hollow pipe of the shaft member, so interference of these umbilical members with the peripheral equipment of the robot can be avoided.

Furthermore, in the fourth aspect, even if the tool is attached to the umbilical member guide mechanism, it is possible to change the phase of the umbilical member fastening part without detaching the tool. Therefore, the motion range of the final output shaft part of the front end of the wrist of the robot can be easily changed as desired.

Typical embodiments were used to explain the present invention, but it will be understood that a person skilled in the art could make the above-mentioned changes and various other changes, deletions, and additions without departing from the scope of the present invention.

The invention claimed is:

1. An umbilical member guide mechanism which guides a plurality of umbilical members, which are led from an arm side of a robot to a wrist part, to a tool which is attached to the front end of the wrist, said umbilical member guide mechanism comprising a shaft member which is arranged at a front end of the wrist of said robot, said shaft member being provided with a hollow pipe which extends coaxially with the axis of center of rotation and a tool mounting surface which is positioned at the front end of said shaft member, an umbilical member fastening part which is attached to said tool mounting surface side of said shaft member, said plurality of umbilical members being guided from the arm side of said robot through said hollow pipe of said shaft member and being fastened by said umbilical member fastening part in parallel with said axis of center of rotation, and attaching parts which attach said umbilical member fastening part to a front end of said shaft member, wherein the umbilical member fastening part is formed with a plurality of through holes and the tool mounting surface is formed with a plurality of tap holes at positions which correspond to the through holes, and wherein the attaching parts include a plurality of bolts to fix the umbilical member fastening part to the tool mounting surface through the plurality of through holes of the umbilical member fastening part and the plurality of tap holes of the tool mounting surface, the plurality of through holes of the umbilical member fastening part and the plurality of tap holes of the tool mounting surface are arranged such that the umbilical member fastening part is configured to be attached to the tool mounting surface with at least two different radial angles with respect to the axis of center of rotation, wherein the umbilical member fastening part includes a rubber clamp in which a plurality of through holes for the plurality of umbilical members are formed asymmetrically, and two fastening parts assembled from the two sides of the rubber clamp, wherein a space between the two fastening parts has a generally regular polygonal shape and the rubber clamp has an outer shape corresponding to the generally regular of polygonal shape of the two fastening parts, wherein one fastening part of the two fastening parts is formed with two through holes, while the other fastening part of the two fastening parts is formed with two through holes, wherein axes of the two through holes of the one fastening part and axes of the two through holes of the other fastening part are parallel with axes of the plurality of through holes of the rubber clamp, and wherein when the two fastening parts are assembled, the two through holes of the one fastening part and the two through holes of the other fastening part are arranged so as to form a square shape.

2. The umbilical member guide mechanism as set forth in claim 1, wherein said tool or a flange which is attached to said tool mounting surface is formed with a through hole and wherein said plurality of umbilical members are guided from said umbilical member fastening part through said through hole up to said tool.

3. The umbilical member guide mechanism as set forth in claim 1, wherein said umbilical member fastening part is arranged inside a recessed part which is formed in said tool mounting surface.

4. The umbilical member guide mechanism as set forth in claim 2, wherein said umbilical member fastening part is arranged inside a recessed part which is formed in said tool mounting surface.

5. An umbilical member guide mechanism which guides a plurality of umbilical members, which are led from an arm side of a robot to a wrist part, to a tool which is attached to the front end of the wrist, said umbilical member guide mechanism comprising:

a shaft member which is arranged at a front end of the wrist of said robot, said shaft member being provided with a hollow pipe which extends coaxially with the axis of center of rotation and a tool mounting surface which is positioned at the front end of said shaft member, said tool which is attached to said tool mounting surface or a flange which is arranged between said tool and said tool mounting surface, said tool or said flange being formed with a through hole, an umbilical member fastening part which is attached to said tool or said flange, said plurality of umbilical members being guided from the arm side of said robot through said hollow pipe of said shaft member and being fastened by said umbilical member fastening part in parallel with said axis of center of rotation, said plurality of umbilical members being guided from said umbilical member fastening part through said through hole of said tool or said flange up to said tool, and attaching parts which attach said umbilical member fastening part to said tool or said flange, wherein the attaching parts are arranged such that the umbilical member fastening part is configured to attach to said tool or said flange with at least two different radial angles with respect to the axis of center of rotation, wherein the umbilical member fastening part includes a rubber clamp in which a plurality of through holes for the plurality of umbilical members are formed asymmetrically, and two fastening parts assembled from the two sides of the rubber clamp, wherein a space between the two fastening parts has a generally regular polygonal shape and the rubber clamp has an outer shape corresponding to the generally regular polygonal shape of the two fastening parts, wherein one fastening part of the two fastening parts is formed with two through holes, while the other fastening part of the two fastening parts is formed with two through holes, wherein axes of the two through holes of the one fastening part and axes of the two through holes of the other fastening part are parallel with axes of the plurality of through holes of the rubber clamp, and wherein when the two fastening parts are assembled, the two through holes of the one fastening part and the two through holes of the other fastening part are arranged so as to form a square shape.

* * * * *